(12) United States Patent
Moritz

(10) Patent No.: US 10,666,627 B1
(45) Date of Patent: *May 26, 2020

(54) ENCRYPTING CONTENT AND FACILITATING LEGAL ACCESS TO THE ENCRYPTED CONTENT

(71) Applicant: BlueRISC, Inc., Amherst, MA (US)

(72) Inventor: Csaba Andras Moritz, Amherst, MA (US)

(73) Assignee: BlueRISC, Inc., Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,910

(22) Filed: Jan. 16, 2019

Related U.S. Application Data

(63) Continuation of application No. 15/236,999, filed on Aug. 15, 2016, now Pat. No. 10,230,702.

(51) Int. Cl.
 *H04L 29/06* (2006.01)

(52) U.S. Cl.
 CPC ........ *H04L 63/061* (2013.01); *H04L 63/0876* (2013.01)

(58) Field of Classification Search
 CPC .......................... H04L 63/061; H04L 63/0876
 USPC .......................................................... 713/171
 See application file for complete search history.

(56) References Cited

U.S. PATENT DOCUMENTS

| | | | |
|---|---|---|---|
| 6,609,201 B1 | 8/2003 | Folmsbee | |
| 6,970,985 B2 | 11/2005 | Moritz | |
| 7,493,607 B2 | 2/2009 | Moritz | |
| 7,996,671 B2 | 8/2011 | Chheda et al. | |
| 8,327,249 B2 | 12/2012 | Jorda et al. | |
| 8,607,209 B2 | 12/2013 | Chheda et al. | |
| 9,411,964 B1 | 8/2016 | Moritz et al. | |
| 9,467,425 B2* | 10/2016 | Epp .................. | H04L 9/0822 |
| 9,754,112 B1 | 9/2017 | Moritz et al. | |
| 10,225,075 B1 | 3/2019 | Moritz | |
| 10,230,702 B1* | 3/2019 | Moritz ............... | H04L 63/0428 |
| 2002/0016910 A1 | 2/2002 | Wright et al. | |
| 2003/0167314 A1 | 9/2003 | Gilbert et al. | |
| 2005/0114850 A1 | 5/2005 | Chheda et al. | |
| 2006/0036859 A1* | 2/2006 | Adams .................. | H04L 9/0891 |
| | | | 713/171 |
| 2007/0044153 A1 | 2/2007 | Schuba et al. | |
| 2007/0260693 A1 | 11/2007 | Cardone et al. | |
| 2007/0294181 A1 | 12/2007 | Chheda et al. | |
| 2008/0034355 A1 | 2/2008 | Shen et al. | |
| 2008/0126766 A1 | 5/2008 | Chheda et al. | |

(Continued)

OTHER PUBLICATIONS

Aho, A. V. et al., Compilers—Principles, Techniques, and Tools; Addison-Wesley, Reading, MA (1986).

(Continued)

*Primary Examiner* — Kambiz Zand
*Assistant Examiner* — Aubrey H Wyszynski
(74) *Attorney, Agent, or Firm* — Burns & Levinson LLP

(57) ABSTRACT

An example method performed by one or more processing devices includes: generating encrypted content at a sender device using one or more first keys that are available from a key provider; and outputting the encrypted content to a recipient device over one or more channels; where the key provider enables access, following authorization, by the recipient device to one or more second keys for decrypting the encrypted content; and where an entity that enables the channel is unaffiliated with the key provider.

31 Claims, 2 Drawing Sheets

(56) References Cited

U.S. PATENT DOCUMENTS

| | | |
|---|---|---|
| 2008/0276227 A1 | 11/2008 | Greifeneder |
| 2010/0070761 A1 | 3/2010 | Gustave et al. |
| 2010/0150341 A1 | 6/2010 | Dodgson et al. |
| 2013/0205285 A1 | 8/2013 | Pizlo |
| 2015/0237016 A1 | 8/2015 | Sao |

OTHER PUBLICATIONS

Alternative to itoa() for converting integer to string C++?, 8 pages (Oct. 23, 2008). URL: http://stackoverflow.com/questions/228005/alternative-to-itoa-for-converting-integer-to-string-c [Retrieved Jun. 21, 2016].

Anderson, R. and Kuhn, M., Tamper Resistance—A Cautionary Note, Proceedings of Second USENIX Workshop on Electronic Commerce, (1996).

Brumley, D. et al., Sting: An End-to-End Self-Healing System for Defending against Internet Worms, 31 pages (Nov. 2005). URL: http://www.cs.berkeley.edu/~dawnsong/papers/2007%20sting-bookchapter-06.pdf [Retrieved Feb. 19, 2016].

Coppola, M., Owning the Network: Adventures in Router Rootkits, Virtual Security Research, LLC. (2012).

Cui, A. and Stolfo, S., Defending Legacy Embedded Systems with Software Symbiotes, The 14th International Symposium on Recent Advances in Intrusion Detection (RAID), 358-377 (2011).

Department of Homeland Security, Critical Infrastructure Sectors, 4 pages (2016). URL: http://www.dhs.gov/criticalinfrastructure-sectors [Retrieved Jun. 21, 2016].

Diskin, G., Binary Instrumentation for Security Professionals, Intel, Blackhat USA (2011).

File History of U.S. Appl. No. 14/551,341, filed Nov. 24, 2014 (Retrieved Jan. 30, 2017).

File History of U.S. Appl. No. 14/551,508, filed Nov. 24, 2014 (Retrieved Jan. 27, 2017).

File History of U.S. Appl. No. 15/193,935, filed Jun. 27, 2016 (Retrieved Jan. 30, 2017).

Gartner, Gartner Says Internet of Things Installed Base Will Grow to 26 Billion Units by 2020, 4 pages (Dec. 12, 2013). URL: http://www.design-reuse.com/news/33491/gartner-internet-of-things.html [Retrieved Feb. 19, 2016].

Gilmont, T. et al., Hardware security for software privacy support, Electronics Letters, 35(24):2096-2097 (1999).

Jenei, S., Anti-Stacking Provisions Can Help Minimize Total Royalty Burden, 3 pages (Mar. 10, 2006). URL: http://www.patentbaristas.com/archives/2006/03/10/anti-stacking-provisions-can-help-minimize-total-royalty-burden, [Retrieved Feb. 19, 2016].

Jha, S., Software Security Issues in Embedded Systems, 2 pages. http://www.cs.wisc.edu/~jha [Retrieved Feb. 19, 2016].

Kean, T., Secure Configuration of Field Programmable Gate Arrays, Proceedings of the 11th International Conference on Field-Programmable Logic and Applications, 19 pages (2001).

Kerner, S.M., Network Equipment Market Growing to $51 Billion by 2015, 2 pages (May 11, 2011). URL: http://www.internetnews.com/infra/article.php/3933236/Network+Equipment+Market+Growing+to+51+Billion+by+2015.htm, [Retrieved Feb. 19, 2016].

Kolodgy, C.J., Market Analysis: Worldwide Security and Vulnerability Management 2011-2015 Forecast and 2010 Vendor Shares, 1: 31 pages (Aug. 2013). URL: http://www.qualys.com/docs/idc_VM_forecast2012.pdf [Retrieved Feb. 19, 2016].

Kommerling, O. and Kuhn, M.G., Design Principles for Tamper-Resistant Smartcard Processors, USENIX Workshop on Smartcard Technology, 13 pages (1999).

Lie, D., Architectural support for copy and tamper resistant software, Proceedings of the 6th International Conference Architectural Support for Programming Languages and Operating Systems, 10 pages (2000).

Messerges, T.S. et. al., Examining Smart Card Security under the threat of Power Analysis, IEEE Transactions on Computers, 51(5):541-552 (2002).

MTC Group LTD., Morpher-Crypt the Script, 3 pages (May 14, 2010). URL: http://morpher.com [Retrieved Jun. 21, 2016].

Non Final Rejection for U.S. Appl. No. 14/551,341, 7 pages (dated Nov. 2, 2016).

Non Final Rejection for U.S. Appl. No. 15/236,970, 23 pages (dated Jun. 4, 2018).

Open Wrt Attitude Adjustment Router Firmware, 3 pages (2016). URL: https://dev.openwrt.org/log/branches/attitude_adjustment [Retrieved Feb. 19, 2016].

Pranith, D.K. et al., Hybrid Analysis of Executables to Detect Security Vulnerabilities, Proceedings of the 2nd India Software Engineering Conference, 141-142 (2009).

Reeves, J., Autoscopy Jr.: Intrusion Detection for Embedded Control Systems, Dartmouth Computer Science Technical Report TR2011-704, 97 pages (Aug. 2011).

Research and Markets: Industrial Control Systems (ICS) Security Market—Global Advancements, Market Forecast & Analysis (2013-2018), 5 pages (Nov. 19, 2013).

Schwarz, B. et al., Disassembly of executable code revisited, IEEE Working Conference on Reverse Engineering, 10 pages (2002).

Skorobogatov, S., Breaking Copy Protection in Microcontrollers, 13 pages (2001). URL: http//:www.cl.cam.ac.uk/~sps32/mcu_lock.html [Retrieved May 12, 2016].

Skorobogatov, S., Tamper Resistance and Physical Attacks, ECRYPT 2006 Summer School on Cryptology, 68 pages (2006).

Slobojan, R., Critical Security Vulnerability Found in QuickSort, 4 pages (Apr. 1, 2009). URL: http://www.infoq.com/news/2009/04/quicksort-security-vulnerability [Retrieved Feb. 19, 2016].

Srivastava, A. and Eustace, A., Atom: A system for building customized program analysis tools, Proceedings of the ACM SIGPLAN 94 Conference on Programming Language Design and Implementation, 196-205 (1994).

Vinciguerra, L. et al., An experimentation framework for evaluating disassembly and decompilation tools for C++ and Java, IEEE Working Conference on Reverse Engineering, 14-23 (2003).

Weinghart, S.H., Physical Security Devices for Computer Subsystems: A Survey of Attacks and Defenses, Workshop on Cryptographic Hardware and Embedded Systems—CHES2000, 302-317 (2000).

File History of U.S. Appl. No. 16/248,395 (downloaded Dec. 3, 2019) (194 pages).

Non-Final Rejection for U.S. Appl. No. 15/236,999, 27 pages (dated Jun. 29, 2018).

File History of U.S. Appl. No. 16/682,859 (downloaded Dec. 3, 2019) (69 pages).

File History of U.S. Appl. No. 15/236,970 (downloaded Dec. 3, 2019) (254 pages).

* cited by examiner

ENCRYPTING CONTENT AND FACILITATING LEGAL ACCESS TO THE ENCRYPTED CONTENT

CROSS REFERENCE TO RELATED APPLICATION

This application is a continuation of U.S. patent application Ser. No. 15/236,999, filed Aug. 15, 2016. As a continuation of U.S. patent application Ser. No. 15/236,999, this application claims the benefit of priority to U.S. patent application Ser. No. 15/236,999, the disclosure of which is incorporated by reference herein in its entirety.

TECHNICAL FIELD

This disclosure relates generally to encrypting content.

BACKGROUND

Encrypting content can prevent unauthorized access to its plain (e.g., non-encrypted) version. Content that is in plain-version, however, may be accessible by unauthorized parties. In some cases content is left in plain-version in exchange for free service, which leaves that content accessible to third parties, including the service provider itself.

Methods, such as public key infrastructure (PKI) encryption and symmetric key encryption, may provide some measure of confidentiality. There are, however, competing considerations between data privacy and access that may be mandated to third parties, e.g., by the courts or law enforcement. Supporting such legal access may include enabling third party access to information, e.g., in the cloud, when lawfully authorized, even without consent of the content owner. For example, information may need to be accessed if a crime is committed. However, since law enforcement typically has no access to cryptographic keys, access may be difficult, if not impossible, in practice.

In some cases, a "back door" may be provided, which allows authorities to access encrypted content, even though they may not have the necessary access mechanisms. Such back doors, or other similar mechanisms, can create vulnerabilities that may also be exploited by third parties.

SUMMARY

An example method performed by one or more processing devices includes: generating encrypted content at a sender device using one or more first keys that are available from a key provider; and outputting the encrypted content to a recipient device over one or more channels; where the key provider enables access, following authorization, by the recipient device to one or more second keys for decrypting the encrypted content; and where an entity that enables the channel is unaffiliated with the key provider. The example method may include one or more of the following features, either alone or in combination.

Generating the encrypted content may comprise: breaking content into first and second fragments; encrypting the first fragment with a first session key and encrypting the second fragment with a second session key; associating the first session key with the second fragment to produce a first pair, and associating the second session key with the first fragment to produce a second pair; and encrypting the first pair and the second pair using the one or more first keys to produce the encrypted content. The first pair of the encrypted content may be output over a first channel and the second pair of the encrypted content may be output over a second channel, with the first channel being different from the second channel. The first pair of the encrypted content may be encrypted using a first key of the one or more first keys and the second pair of the encrypted content may be encrypted using a second key of the one or more first keys, with the first key being different from the second key. The first key may be from a first key provider and the second key may be from a second key provider. The first key provider may be different from the second key provider. The one or more channels may be defined by one or more cloud service providers. The one or more second keys may include a PGP private key.

An example method performed by one or more processing devices, includes: obtaining one or more cryptographic keys from one or more key providers, with the one or more cryptographic keys being accessible from the one or more key providers through an authentication process; encrypting content using the one or more cryptographic keys to produce at least part of encrypted content; and outputting the encrypted content from a sending device to a recipient device, with the encrypted content requiring, for decryption thereof, authentication via the one or more key providers. The example method may include one or more of the following features, either alone or in combination.

Encrypting the content may comprise: generating one or more session cryptographic keys at the sending device; encrypting part of the content using the one or more session cryptographic keys; and encrypting the one or more session cryptographic keys using the one or more cryptographic keys from the key provider; where the encrypted content comprises (i) the part of the content encrypted using the one or more session cryptographic keys and (ii) the one or more session cryptographic keys encrypted using the one or more cryptographic keys from the key provider. Encrypting the content may comprise: generating session cryptographic keys at the sending device; breaking at least part of the content into fragments; and encrypting each of the fragments using a different session cryptographic key to produce at least part of the encrypted content. Outputting the encrypted content may comprise outputting each encrypted fragment over a different channel.

Encrypting the content may comprise: generating a session cryptographic key at the sending device; breaking at least part of the content into fragments; and encrypting each of the fragments using the session cryptographic key to produce at least part of the encrypted content; where outputting the encrypted content comprises outputting each encrypted fragment over a different channel. Encrypting the content may comprise: generating one or more session cryptographic keys at the sending device; breaking at least part of the content into fragments; encrypting each of the fragments using a different session cryptographic key; and encrypting the one or more session cryptographic keys to produce at least part of the encrypted content, with the one or more session cryptographic keys being encrypted using the one or more cryptographic keys from the key provider.

The content may comprise social media content. The one or more cryptographic keys may be part of a PGP private and public key pair, with the PGP private key being encrypted and stored at the one or more key providers.

An example method performed by one or more processing devices, includes: breaking content into fragments; encrypting each of the fragments using one or more first cryptographic keys to produce encrypted fragments; encrypting the one or more first cryptographic key to produce encrypted keys using one or more second cryptographic keys obtained from one or more key providers; incorporating the encrypted keys into the encrypted fragments; and outputting the encrypted fragments from a sending device to a recipient device; where the one or more key providers are accessible to the recipient device following authentication. The example method may include one or more of the following features, either alone or in combination.

Outputting the encrypted fragments may comprise outputting each of the encrypted fragments over a separate, different channel. Incorporating the encrypted keys into the encrypted fragments may comprise: including a first cryptographic key for a first fragment with a second fragment that is different from the first fragment; and including a second cryptographic key for the second fragment together with the first fragment. Different second cryptographic keys from different key providers may be used to encrypt the first cryptographic key and the second cryptographic key. Outputting the encrypted fragments may comprise outputting each of the encrypted fragments using separate electronic mail messages. The content may comprise social media content.

Two or more of the features described in this disclosure, including those described in this summary section, may be combined to form implementations not specifically described herein.

The various systems described herein, or portions thereof, may be implemented via a computer program product that includes instructions that are stored on one or more non-transitory machine-readable storage media, and that are executable on one or more processing devices (e.g., microprocessor(s), application-specific integrated circuit(s), programmed logic such as field programmable gate array(s), or the like). The systems described herein, or portions thereof, may be implemented as an apparatus, method, or electronic system that may include one or more processing devices and computer memory to store executable instructions to implement control of the stated functions.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Figure 1:
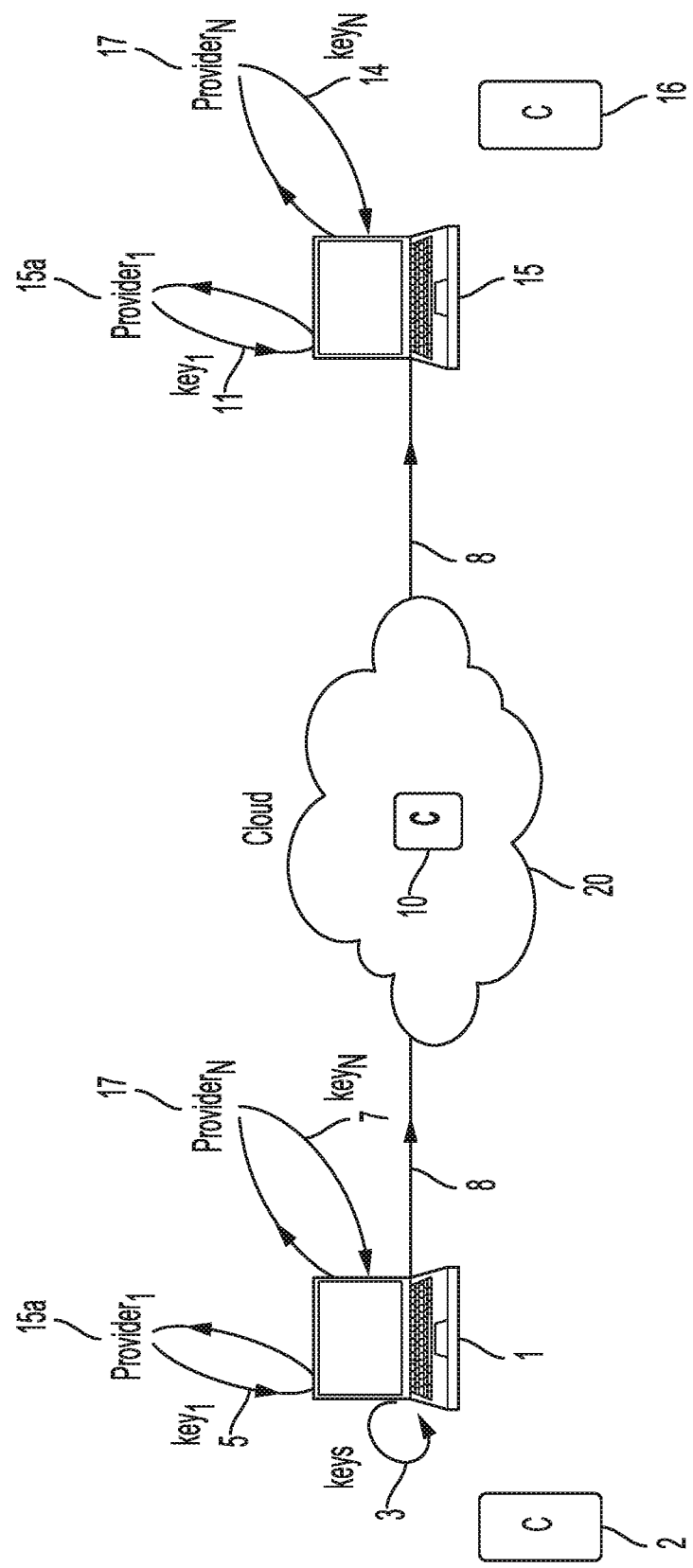
FIG. 1 is block diagram of an example system for encrypting content.

Described herein are example processes for protecting data (e.g., content) privacy, while also enabling third-party legal access to that data. The example processes may employ various types of encryption.

In this regard, systems that implement end-to-end content privacy (e.g., between sender device and recipient device) have heretofore employed at least one cryptographic key that is controlled solely by the sender or the recipient. While such systems can support data privacy, those systems can make access by legally authorized third parties (who are not the sender or the recipient) difficult. For example, in existing systems, access to encrypted content requires the sender and/or the recipient to cooperate; that is, to provide their cryptographic key(s) for content access. However, the sender and/or the recipient may not want to cooperate or may be unavailable. In such cases, the content may not be accessible. Accordingly, the processes described herein maintain content privacy, but do not rely solely on cryptographic keys held by the sender and/or recipient to maintain content privacy. As a result, third parties who are legally authorized (e.g., through the court system, law enforcement, employer, etc.) to access the content may obtain access without requiring cooperation of the sender and/or the recipient.

In some examples, encryption includes processes to obfuscate content so that the content cannot be reverse engineered and accessed in its plain-version form absent the appropriate mechanisms required for access. In some examples, encryption may be implemented using a mathematical framework or one or more cryptographic algorithms, and an associated cryptographic key or cryptographic key pair. Herein, a cryptographic key may be referred to simply as a "key".

In some examples, decryption includes one or more processes to reverse content encryption to produce its plain-version from its encrypted version. In some examples, decryption may be performed using the same key(s) that were used to encrypt the content. In some examples, decryption may be performed using different key(s) than were used to encrypt the content.

In some examples, authentication (abbreviated "auth" herein) includes processes to confirm authenticity, e.g., to confirm that the content and/or the destination are as the sender of the content intended. Authorization may be performed by a device or system (e.g., a key provider) that confirms a user or device password. In some examples, authorization enforces access only by some parties, and prevents other parties from access. In this regard, authentication includes confirming that a party is who they claim to be and, once authenticated, is allowed to perform some action. For example, a content recipient is authenticated and, if authorized, may access some service.

Authentication may be combined with encryption to produce a protection mechanism referred to as authenticated encryption. For example, as described herein, content may be encrypted by a sender using one or more keys. The content may be sent over one or more computer networks to a recipient. The recipient may then access a key provider, provide appropriate authentication information such as a password, and obtain a key or keys used to decrypt and, thereby access, the content. The key provider is different from the service or system used to send the content (e.g., the electronic mail (e-mail)) service provider used to send the content. As a result, the service provider cannot access the content (since it is encrypted). However, the recipient can access the content following appropriate authentication. Legal access, however, does not require the cooperation of the sender or the recipient. Rather, legal access to the content may be obtained through cooperation of the e-mail provider (to obtain the encrypted content) and the key provider (to obtain the key(s)) for decryption. As a result, legal access may be obtained, while preserving data privacy. Variations on this process may be employed, as described herein. For example, in some implementations, session keys are employed and encrypted using key(s) from a key provider. In some implementations, different transmission channels may be used to send different fragments of content, along with session keys used to encrypt other fragments. Different features of different implementations may be combined, as appropriate.

In some examples, a transmission channel includes a communication channel (or simply, "channel") over which information may be transmitted between a sender and a recipient. No particular physical structure is required or implied by a channel. Rather a channel can be any appropriate medium or media, whether wired or wireless, over which information can be moved from one place to another. Such information may include any appropriate digital content such as, but not limited to, electronic mail (e-mail), simple message service (SMS or text) messages, social media or other Web content, and so forth. For example, two different e-mail providers may represent, and use, two different channels (since messages are routed through different servers and along different pathways).

The cloud includes, but is not limited to, computing systems that are external to a user or device, and that may offer services to process data, store data, and/or transmit data. For example, the cloud may include, and be implemented using, a network of computers (e.g., servers and/or other types of processing devices), which may be accessible over one or public and/or private networks (e.g., the Internet and/or one or more intranets). Different computers in the cloud may perform different functions or the functions performed by different computers may be duplicated. For example, some computers may use computing resources to run applications or to deliver services, whereas other computers may perform other functions, such as data storage, load balancing, communications, network routing, and so forth. The cloud is typically accessible from any device through connection to a network. Computers or devices in the cloud can store a user's content temporarily or persistently, and can be used to implement channels. For example, some computers in the cloud may support a first e-mail service, whereas other computers in the cloud may support a second, different e-mail service. One or more computers in the cloud may also be used to implement key providers. In example implementations described herein, the key providers are different from the entities used to support the channels. More specifically, because the key providers are different from the entities supporting the channels, in no case will a single entity (other than the sender and intended recipient) have access to both the content and key(s) used to decrypt that content. As a result, privacy is protected. However, since the content and keys may be accessible from entities other than the sender and the recipient (e.g., the key provider and an e-mail service provider), legal access can be obtained to the content absent cooperation of the sender and/or recipient.

In some examples, a party includes one or more entities that are capable of sending content, of accessing content, and/or of receiving content. For example, a party may include a company or a separate group or system having no cross-over access to a third party or that third party's systems.

Described herein are example processes for implementing digital privacy on an end-to-end system (e.g., between sender device and recipient device), which employ cryptographic keys (or equivalents thereof) and/or channels that are used by separate parties or that are otherwise physically isolated from each other. The example processes may be employed to maintain content (or, more generally, data) privacy in cloud-based systems, while allowing third parties, such as law enforcement, legal access to that content. Keys that are used may include one-time or session keys, which may be generated by the content owner on a sender device, and/or keys provided by a key provider. One-time or session keys are usable once (e.g., for both encryption and decryption), and expire following use. In some implementations, the example processes described herein may protect content from unauthorized access when that content is transmitted from a user device to a third party device, but passes through one or more cloud-based systems.

In some implementations, content privacy is supported through cryptography and by ensuring that no single party in the cloud has access to all keys and/or all channels that are used to implement the cryptography. For example, in a content sender's device, cryptographic keys may be mixed and/or different layers of encryption may be applied to the encryption keys, thereby preventing third parties from using those keys. Methods of obfuscating content that are different from keys may also be employed in the manner described herein.

During communication between a sender (e.g., a device, system, etc.) and a receiver (e.g., a device, system, etc.), keys used by the sender to encrypt content can be provided to the recipient following proper authentication. The content can be decrypted using those keys. For example, in some implementations, a sender may request a key for encryption from a key provider. The sender may provide an appropriate password to the key provider and, following that authentication, receive the key from the key provider. The sender may encrypt the content using the key, and then send the resulting encrypted content to the recipient device over a network in the cloud. The recipient may request a key to decrypt the content from the same key provider or from a different key provider. The recipient may provide a password to the key provider in order to obtain the key. Following authentication of the recipient by the key provider, the key provider may provide the key(s) to decrypt the content to the recipient. The recipient may then decrypt the content. Thus, neither the sender nor the recipient is in complete control of the encryption or decryption keys, and the content remains encrypted in the cloud, thereby preventing access by third parties, including services in the cloud. The key provider is typically an entity that is unaffiliated with any transmission path or mechanism through the cloud and, as such, no single entity other than the sender or recipient has access to both the encrypted content and keys used for decryption.

Accordingly, as described above, receiving keys from key providers may require separate authentications of both the sender and the recipient. For example, access to a key can be password enabled. For authentication, a user may be required to input a password and/or other identifying indicia into a key provider, such as a key management system comprised of one or computing devices. That password may need to be verified before the user can access any keys. One or more key providers may be accessed by the sender to encrypt all or part of content to be transmitted; and one or more key providers may be accessed by the receiver to decrypt all or part of the encrypted content that has been received. The key provider(s) used to provide key(s) for encryption may be the same as, or different from, the key provider(s) used to provide key(s) for decryption.

In some implementations, authentication ensures that a message and/or the recipient of that message comport with the sender's original intent and/or that only a sender-chosen destination system or systems can access encrypted content in its plain-version form. In the cloud, e.g., in a computer system outside of the sender's computer system, encrypted content that is part of the message is stored in its encrypted version only. Consequently, no single party or system involved in content transmission or storage, e.g., in providing individual keys, authentication, channels, and/or cloud services, can decrypt the content without access to the proper keys used for decryption. This is typically the case even if such a party or system is able to access the encrypted content. Generally, the only single parties with access will be the sender, the recipient, or an entity with legal access.

In some implementations, non-key content is broken into multiple content fragments (or simply, "fragments") by, and at, the sender computer system. For example, one or more computer programs running on the sender computer system may break-up or split the content to form the fragments of the same or different sizes. In such examples, different transmission channels (e.g., different e-mail providers) may be used to transmit different fragments. For example, different fragments may be transmitted over different ones of the multiple transmission channels. The fragments may each be encrypted with one-time session keys that are also transmitted over the same, or different, ones of the channels as the fragments. In some implementations, a transmitted key is transmitted over a different channel than its corresponding fragment, although this is not a requirement. For example, key1 used to encrypt fragment1 may be transmitted with fragment2, and key2 used to encrypt fragment2 may be transmitted with fragment1 (where the indicia "1" and "2" signify different keys and fragments). Key1, fragment2 may be transmitted over a different channel than key2, fragment1.

The transmitted keys themselves can be also encrypted by the authentication/authorization party (e.g., the key provider), or by another party, and recovered at the destination after authentication as described herein. For example, key1, fragment2 may be encrypted using a key from a key provider, and key2, fragment1 may be encrypted using the same key or a different key from the same key provider or a different key provider. In some implementations, since no party has access to all keys of any other party, privacy protection is also supported in the cloud. For example, as described above, the session keys themselves may be embedded in fragments that are reconstructed at the destination after authentication. The session keys may contain data identifying the fragments that they are used to encrypt. As such, following decryption of the session keys, the recipient device may use the individual decrypted session keys to decrypt the appropriate fragments.

In some implementations, only content senders and recipients are able to access the plain-version of the encrypted content. Everywhere else on the end-to-end system between the sender and the recipient systems, the content is protected through encryption, thereby supporting its privacy. In some implementations, keys are either provided by outside parties (e.g., key providers) or by the sender's system for embedding into one or more encrypted fragments. This overall approach may facilitate legal access because content in the cloud can be reassembled assuming all parties agree to provide their keys. As noted, the outside parties are different entities from those in control of a channel over which encrypted content is transmitted, thereby isolating the keys from the encrypted content in the cloud or over any other external transmission media.

Thus, by virtue of the example processes described herein, it is possible to obtain access to plain-version content even if the parties involved in a transaction do not agree to allow access (e.g., by providing secret keys), where a transaction includes any transfer and receipt of data. Accordingly, access may be achieved if there is a legal requirement, but restricted in the event of an attack or unauthorized attempt at access by one or more of the involved parties or by one or more third parties. Thus, in some implementations, successfully decrypting content requires simultaneous access to the keys, the encrypted content, and possibly other system aspects across multiple parties.

In some implementations, the example processes described herein are based on a number of parties involved in sending and receiving data, and on their roles as sender or recipient in the data transaction. In some implementations, depending on the amount of privacy desired, two (or more) channels and/or a separate key-providing party or parties may be used. The difficulty involved in enabling legal access increases as more keys/key providers and/or more channels are used. PKI-based encryption can also be extended to allow legal access as described herein with respect to electronic mail (e-mail).

By using two or more channels for content transmission, content fragments and keys used to encrypt/decrypt those content fragment can be isolated (or substantially isolated) during transmission. In this context, isolation does not require use of any particular protocols or circuitry, but rather may be achieved simply through use of different communication paths or devices for data transmission. More specifically, separate content fragments can be transmitted over separate channels, thereby achieving physical isolation of those fragments. Individual fragments may be encrypted using one-time session keys generated in the sender's device. Those individual session keys may be transmitted with different fragments. For example, as described above, key1 used to encrypt fragment1 may be transmitted with fragment2, and key2 used to encrypt fragment2 may be transmitted with fragment1. Fragment1, key2 may be transmitted over a first physical channel (e.g., via a first e-mail provider), and fragment2, key1 may be transmitted over a second physical channel (e.g., via a second e-mail provider). The session keys and fragments may also be encrypted using one or more keys from one or more different key providers. The sender may request, and receive, the key(s) for encryption from one or more key providers following proper authentication. The recipient may request, and receive, the key(s) for decryption from one or more key providers following proper authentication. The one or more key providers may be different systems (e.g., different service providers) than the first and second e-mail providers, thereby ensuring that no single entity in the cloud has everything needed (e.g., both keys and encrypted content) to access the plain-version content, while also still allowing legal access by not limiting access to requiring secret key(s) from the sender or recipient. For example, keyA from providerA may be used to encrypt key2; and keyB from providerB may be used to encrypt key1, where providerA and providerB are different key providers and are unaffiliated with the services (e.g., e-mail providers, cloud storage, or other services) used to implement the different channels. The sender and recipient may obtain keyA from providerA and keyB from providerB upon appropriate authentication.

In some implementations, the content provider may also play an authentication role. As described herein, some implementations may include a single provider and a single channel. As described herein, some implementations may include multiple key providers and multiple channels, thereby making it more difficult for unauthorized parties to access content. That is, keys for different fragments may be accessible from different key providers, following appropriate authentication(s). As noted herein, the example processes may be used to secure data associated with any appropriate applications including, but not limited to, e-mail, cloud storage, text messages, and public and private social networks.

FIG. 1 shows an example of a system on which examples of the processes described herein may be implemented. In the example of FIG. 1, each device may be or include one or more computing devices. Examples of computing device include, but are not limited to, various forms of digital computers, examples of which include laptops, desktops, workstations, personal digital assistants, servers, blade servers, mainframes, and other appropriate computers. Examples of computing device also include, but are not limited to, various forms of mobile devices, examples of which include personal digital assistants, cellular telephones, smartphones, and other similar computing devices. The components shown in FIG. 1, their connections and relationships, and their functions, are meant to be examples only, and are not meant to limit implementations of the technology described and/or claimed in this document.

In FIG. 1, device 1 is configured to transmit content ("C") 2 for use (e.g., viewing) at device 15. In this example, content 2 includes non-key content, such as e.g., text, images, video, audio, etc. Prior to transmission, content 2 is encrypted by device 1 using one or more keys to produce encrypted content 10. In this example, a one-time session key (or keys) is generated in device 1 and is used to encrypt the content. This key is temporary and, therefore, is only available to the device for a limited period of time, after which the key expires. In some implementations, the encrypted content includes an encrypted version of this session key. So, in examples such as this, encrypting the content includes encrypting at least part of content that does not include the session keys (e.g., text, images, video, audio, etc.) and at least part of content comprising the session keys. The session key may be encrypted using one or more keys 5, 7 obtained from respective key providers 15a, 17. As part of the key encryption, the sender is authenticated, e.g., by providing one or more passwords to each key provider(s) in order to receive the keys for encryption. The sender can also provide a hash of its content and destination address, and include that hash in the encrypted content sent to the recipient. As part of this transaction, device 1 selects, and transmits the encrypted content (including encrypted session key(s)) over, channel 8 and through cloud 20. A service provider (not shown) in cloud 20 provides a service that is used in transmission of the content between the sender and the recipient.

Following receipt of the encrypted content 10, the recipient device 15 contacts key provider(s) 15a, 17, and proves, using any appropriate method (e.g., by providing one or more passwords), that it is authorized to access the encrypted content. The recipient device 15 then receives, from the key providers, the keys used to decrypt the content. The keys 11, 14 may be the same as, or different from, the keys 5, 7 used to encrypt the content. The recipient device uses the received keys to decrypt the session key(s) in the encrypted content, and then uses the decrypted session key(s) to decrypt the remainder of the encrypted content to produce plain-version content ("C") 16, which is accessible to recipient device 15.

In the example of FIG. 1, the encrypted content is sent over a single channel and is not fragmented. However, as described herein, the encrypted content may be fragmented, and sent over multiple channels.

In some implementations, the processes described herein can be configured to ensure that the content is not tampered-with during transmission by allowing the recipient to verify the content's integrity. For example, the hash of the content and/or destination address may be used to verify the integrity of the content. That is, the recipient may perform the same hash of the content, and compare its hash to that of the send to confirm that the content has not changed.

Content 2 remains encrypted outside of the sender's device and the sender-chosen recipient's device, supporting privacy in the cloud. Encrypted content 10 can be decrypted by a party having access appropriate keys, such as key 11 and key 14, provided that the appropriate cloud-based service provider allows access to the encrypted content. That is, all providers involved would need to be required (e.g., by law) to provide access in order for the content to be viewable by the authorities. This requirement may limit abuse, but allow for legal access. In some implementations, there are multiple (e.g., two or more) key providers used, which has the effect of raising the threshold for legal access. However, in some implementations, one key provider may be sufficient for privacy and may still involve two parties, making it more difficult to compromise content. In any case, in some implementations, access to the plain-version of the content does not rely upon secret keys that are maintained by the sender or the recipient, making legal access a possibility even if the sender and/or the recipient refuses to cooperate.

Figure 2:
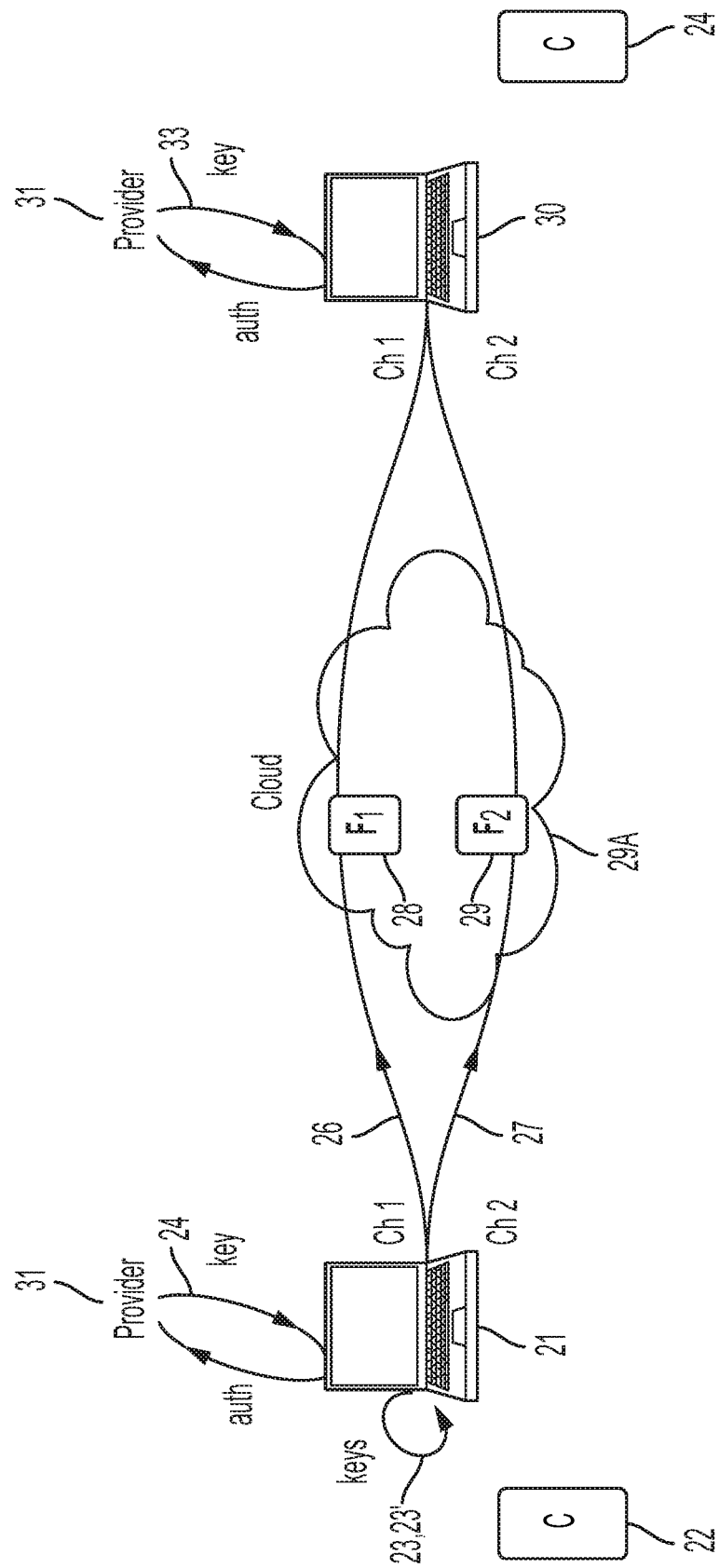
FIG. 2 is a block diagram of another example system for encrypting content.

FIG. 2 shows an example of a system on which examples of the processes described herein may be implemented. In the example of FIG. 2, each device may be or include a computing device. Examples of computing device include, but are not limited to, various forms of digital computers, examples of which include laptops, desktops, workstations, personal digital assistants, servers, blade servers, mainframes, and other appropriate computers. Examples of computing device also include, but are not limited to, various forms of mobile devices, examples of which include personal digital assistants, cellular telephones, smartphones, and other similar computing devices. The components shown in FIG. 2, their connections and relationships, and their functions, are meant to be examples only, and are not meant to limit implementations of the technology described and/or claimed in this document.

Referring to FIG. 2, in this example, device 21 is configured to send content ("C") 22 to device 30 for access by device 30 only. In this example, a user sending content 22 is authenticated by an external key provider 31 (e.g., by sending a password to the provider) and receives a key 24 that is usable for encryption. In some implementations, multiple keys from one or more key providers may be used for encryption, as described herein. That same key provider or key providers may ensure that only the correct destination device can access that key(s) (e.g., by requiring a password from that device) and that the key(s) can only be used for that particular content 22. Device 21 also generates keys 23 and 23' internally. Keys 23 and 23' may be session keys, which expire after a single use. In this example, device 21 splits content ("C") 22 into multiple (e.g., two or more) fragments. For example, the content may be split bit-wise or in any other appropriate manner. The resulting fragments are then encrypted using key 23 and key 23', respectively. Keys 23 and 23' are encrypted using key 24. In some implementations, the resulting encrypted keys are embedded into messages for different fragments, along with an indication as to which fragment the encrypted keys are for (e.g., encrypted key 23 may be embedded in, or otherwise included in, the fragment encrypted using key 23', and encrypted key 23' may be embedded in, or otherwise included in, the fragment encrypted using key 23). In some implementations, the resulting encrypted keys are embedded into the corresponding message for each fragment.

In some implementations, resulting encrypted fragments 28 and 29 are each sent over a different channel, e.g., channels ("Ch 1") 26 and ("Ch 2") 27, respectively, which pass through cloud 29 on the path to the content's destination, here device 30. In cloud 29, the two encrypted fragments 28 and 29 are serviced (e.g., transmitted/forwarded, stored, or otherwise processed) by two separate providers ($F_1$ and $F_2$, respectively) and may be stored in their encrypted versions (in the cloud or elsewhere) before being sent to device 30. Following receipt of the encrypted fragments at device 30, the recipient is authenticated by the key provider 31 using appropriate passwords. The recipient device receives key 33 from the key provider. Key 33 may be the same as, or different from, key 24 that was used to encrypt keys 23 and 23'. Key 33 is used by device 30 to decrypt keys 23 and 23'. Keys 23 and 23' are used by device 30 to decrypt their corresponding fragments, whereafter the decrypted fragments are reassembled to produce the original content ("C") 24 that was transmitted from the sender's device.

In some implementations, resulting encrypted fragments 28 and 29 may be each sent over the same channel. In such implementations, privacy remains supported so long as the key provider is not the same entity that supports the channel (e.g., so long as the key provider is not the same e-mail service provider that is used to send the content from the sender to the recipient).

In these examples, privacy is supported, since the content remains encrypted at all locations outside of the sender and recipient devices, and since decryption of the content requires coordination and cooperation of multiple parties, including cloud service providers for channels 26 and 27 and the key/authentication provider. Legal access can be provided, since the entire message can be reconstructed if access is provided to fragments 28 and 29 and to the appropriate key(s), and coordination and cooperation of multiple parties is obtained. As was the case above, however, since the keys used for encryption and/or decryption are not secret keys held by the sender and/or recipient, legal access can be obtained without their cooperation, if necessary.

In some implementations, different (e.g., two or more) e-mail providers may be used to send different content fragments, either encrypted or not, and thereby provide additional privacy/protection. In such implementations, the sender and receiver devices may execute corresponding software or utilize proxy software and existing e-mail client software to support sending and receiving e-mail from the different providers. In some implementations, different e-mail addresses can be used. In some implementations, an alias to a physical address of the user's device is implemented instead, e.g., though translation via a proxy and e-mail service.

In some implementations, the e-mail is broken in the client or proxy into multiple (e.g., two or more) fragments. The split may be bit-wise or by any other appropriate methodology. In some implementations, each fragment is encrypted using a different session key that is unique and generated in the sender's device. Each encrypted fragment may be part of a separate message and include a separate key that is used to encrypt another fragment in another message or in the same message. The fragment keys can also be encrypted using a key provided by a privacy service provider (e.g., key provider 15a of FIG. 1) or by multiple such providers. The e-mail messages are sent using separate service providers supported by both the sender and recipient computer systems. The destination address may be translated into two destination physical e-mail addresses by a proxy and the privacy service. This example assumes the recipient device uses the same privacy service as the sender. However, this is not a requirement. In examples, key1 used to encrypt fragment1 may be transmitted with fragment2, and key2 used to encrypt fragment2 may be transmitted with fragment1; the key1, fragment2 and key2, fragment1 combinations may be transmitted over the same or separate channels; and the key1, fragment2 and key2, fragment1 combinations may be encrypted using the same or different keys from the same or different key providers.

Content fragments remain encrypted at the sender's e-mail outbox and destination's IMAP server(s). The recipient device's proxy decrypts and reassembles the fragments into a plain-version message following authentication with the privacy service provider, as described herein (e.g., through password input). The e-mail client at the destination receives the reconstructed e-mail through the proxy. In some implementations, this decryption and assembly are performed every time e-mail is accessed. Legal access may be obtained through cooperation of, e.g., the destination's e-mail provider(s) and the privacy service provider.

Pretty good privacy (PGP) encryption relies on PKI. In PGP encryption, a user has a public key and a private (or secret) key. Private keys are stored in the sending and receiving devices and are not visible or otherwise obtainable by third parties, since the security of PGP is based on restricted access to the private keys. Public keys are accessible to third parties and are used by third parties to encrypt content. The private key may be used by the key owner to decrypt content encrypted using the public key. A benefit of PGP is that it allows encryption to performed using a key that is publicly known, without requiring disclosure of private keys. PGP processes can be extended in various ways to enable access to content by legally-authorized third parties, such as governmental agencies. For example, a PGP private key may be encrypted and stored at one or more key providers. If needed, legal access is possible, assuming that the key to encrypt the PGP private key is accessible and the key provider cooperates. However, as elsewhere here, cooperation of the private key owner is not required.

In some implementations, different (e.g., two or more) cloud storage or other cloud service providers may use, support, or define different (e.g., two or more) channels. Similar to the e-mail example described herein, content may be segmented into fragments and those fragments may be encrypted by proxy software running in the sender's device or another appropriate device. In some implementations, access (e.g., access to links) to the content may require proper authentication with a privacy service provider and access to the content fragments sent by the sender. In some implementations, the recipient proxy reassembles the content on-the-fly (e.g., in real-time), serially as each fragment is decrypted, as appropriate. Legal access, in some implementations, may require access to the two cloud storage sites for the fragments.

In some implementations, a key from a privacy service provider is used instead of different channels or different storage providers. In such implementations, a service-provider supplied key may be used encrypt a session-key generated in a proxy device. Content may be stored in the cloud and encrypted using the session key. The encrypted session key may be stored together with the content.

In some implementations, such as private social networks, cloud-based social network content may be made accessible to designated members only (e.g., only to a subset of members of the social network). For example, each user may be part of a privacy circle comprised of members with whom content, or a subset of content, is shared. In an example, the owner of a content uploads the content to the private social network. A session key is used to encrypt the content, and a privacy service provides an encryption key that is used to encrypt the session key in the manner described herein. When a designated user accesses content, e.g., through a Web application or dedicated software, content is presented if that user is in the content owners privacy circle and, therefore, has access to the encryption key that is used to decrypt the session key. Access to the content by third parties (e.g., government agencies) may require cooperation from both the storage provider and the privacy service provider.

In some implementations, two storage providers may be used instead of, or in addition to, two channels for the transmission and security of content. In such implementations, a key may not be needed from the privacy service provider, since content is fragmented and is stored with session keys that are not used for content in the same channel/provider. In some implementations, the privacy service may use a key pool and generate a user-content specific key, for example, by mixing with an owner-specific secret key, a randomly-selected pool key. This key is then used to encrypt the fragment keys. This key could be identified using a tag that may be embedded in the stored content or split across the fragments. Access by third parties, such as government agencies, may require access to the encrypted fragments with the cloud storage providers and possibly the privacy service provider. The user's privacy circle could be updated to remove a right to access its social content by a member or add new members.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

All or part of the systems and techniques described herein, as appropriate, can be implemented in one or more computing systems that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing systems can include clients and servers. A client and server are generally remote from each other and typically interact through a communication network. The relationship of client and server arises by virtue of computer programs running on the respective computers and having a client-server relationship to each other.

All processes described herein and variations thereof (referred to as "the processes") may contain functionality to ensure that party privacy is protected. To this end, the processes may be programmed to confirm that a user's membership in a social networking account is publicly known before recommending a connection to that user through the social networking account. Likewise, the processes may be programmed to confirm that information about a party is publicly known before divulging that information to other party, or even before incorporating that information into a social graph. In the context of this disclosure, the terms social network and social networking service may be used interchangeably.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:
1. A method comprising:
   encrypting content at a sending device using one or more session keys to produce encrypted content;
   encrypting the one or more session keys at the sending device to produce one or more encrypted session keys;
   sending the encrypted content and the one or more encrypted session keys over one or more channels from the sending device to a receiving device;
   receiving the encrypted content and the one or more encrypted session keys at the receiving device;
   decrypting the one or more encrypted session keys at the receiving device to produce the one or more session keys at the receiving device; and
   decrypting the encrypted content at the receiving device using the one or more session keys to produce the content at the receiving device;

wherein the one or more session keys are encrypted at the sending device using information obtained from a first device that is different from the sending device and the receiving device; and wherein the one or more encrypted session keys are decrypted at the receiving device using information obtained from a second device that is different from the sending device and the receiving device.

2. The method of claim 1, wherein the first device and the second device are the same device.

3. The method of claim 1, wherein the first device and the second device are different devices.

4. The method of claim 1, wherein one or more entities control the one or more channels; and wherein the one or more entities are unaffiliated with the first device and the second device.

5. The method of claim 1, wherein at least one of the one or more session keys expires after a single use.

6. The method of claim 1, further comprising:

sending data for verifying an integrity of the content from the sending device to the receiving device; and verifying the integrity of the content at the receiving device using the data.

7. The method of claim 6, wherein the data is a hash of the content.

8. The method of claim 1, wherein encrypting the content comprises breaking the content into fragments and encrypting each of the fragments using a session key among the one or more session keys to produce encrypted fragments; and wherein sending the encrypted content and the one or more encrypted session keys comprises associating an encrypted fragment with an encrypted session key that is an encrypted version of a session key used to encrypt the encrypted fragment, and sending the encrypted fragment and the encrypted session key to the receiving device together over a same channel among the one or more channels.

9. The method of claim 1, wherein encrypting the content comprises breaking the content into fragments and encrypting each of the fragments using a session key among the one or more session keys to produce encrypted fragments; and wherein sending the encrypted content and the one or more encrypted session keys comprises identifying an encrypted fragment and an encrypted session key that is an encrypted version of a session key used to encrypt the encrypted fragment, and sending the encrypted fragment and the encrypted session key to the receiving device over different channels among the one or more channels.

10. The method of claim 1, wherein encrypting the content comprises breaking the content into fragments and encrypting each of the fragments using a session key among the one or more session keys to produce encrypted fragments; and wherein sending the encrypted content and the one or more encrypted session keys comprises associating an encrypted fragment with an encrypted session key that is an encrypted version of a session key used to encrypt a different encrypted fragment, and sending the encrypted fragment and the encrypted session key to the receiving device together over a same channel among the one or more channels.

11. The method of claim 1, wherein encrypting the content comprises breaking the content into fragments and encrypting each of the fragments using a session key among the one or more session keys to produce encrypted fragments; and wherein sending the encrypted content and the one or more encrypted session keys comprises sending at least some of the encrypted fragments over different channels among the one or more channels.

12. The method of claim 1, wherein the information obtained from the first device and the information obtained from the second device comprises one or more keys that are different from the one or more session keys.

13. A system comprising:

a sending device configured to perform operations comprising:

encrypting content using one or more session keys to produce encrypted content;

encrypting the one or more session keys to produce one or more encrypted session keys; and sending the encrypted content and the one or more encrypted session keys over one or more channels to a receiving device;

the receiving device configured to perform operations comprising:

receiving the encrypted content and the one or more encrypted session keys;

decrypting the one or more encrypted session keys to produce the one or more session keys at the receiving device; and decrypting the encrypted content using the one or more session keys to produce the content at the receiving device;

wherein the sending device is configured to encrypt the one or more session keys using information obtained from a first device that is different from the sending device and the receiving device; and wherein the receiving device is configured to decrypt the one or more encrypted session keys using information obtained from a second device that is different from the sending device and the receiving device.

14. The system of claim 13, wherein the first device and the second device are the same device.

15. The system of claim 13, wherein the first device and the second device are different devices.

16. The system of claim 13, wherein one or more entities control the one or more channels; and wherein the one or more entities are unaffiliated with the first device and the second device.

17. The system of claim 13, wherein at least one of the one or more session keys expires after a single use.

18. The system of claim 13, wherein the operations performed by the sending device further comprise sending data for verifying an integrity of the content to the receiving device; and wherein the operations performed by the receiving device further comprise verifying the integrity of the content using the data.

19. The system of claim 18, wherein the data is a hash of the content.

20. The system of claim 13, wherein encrypting the content comprises breaking the content into fragments and encrypting each of the fragments using a session key among the one or more session keys to produce encrypted fragments; and wherein sending the encrypted content and the one or more encrypted session keys comprises associating an encrypted fragment with an encrypted session key that is an encrypted version of a session key used to encrypt the encrypted fragment, and sending the encrypted fragment and the encrypted session key to the receiving device together over a same channel among the one or more channels.

21. The system of claim 13, wherein encrypting the content comprises breaking the content into fragments and encrypting each of the fragments using a session key among the one or more session keys to produce encrypted fragments; and
   wherein sending the encrypted content and the one or more encrypted session keys comprises identifying an encrypted fragment and an encrypted session key that is an encrypted version of a session key used to encrypt the encrypted fragment, and sending the encrypted fragment and the encrypted session key to the receiving device over different channels among the one or more channels.

22. The system of claim 13, wherein encrypting the content comprises breaking the content into fragments and encrypting each of the fragments using a session key among the one or more session keys to produce encrypted fragments; and
   wherein sending the encrypted content and the one or more encrypted session keys comprises associating an encrypted fragment with an encrypted session key that is an encrypted version of a session key used to encrypt a different encrypted fragment, and sending the encrypted fragment and the encrypted session key to the receiving device together over a same channel among the one or more channels.

23. The system of claim 13, wherein encrypting the content comprises breaking the content into fragments and encrypting each of the fragments using a session key among the one or more session keys to produce encrypted fragments; and
   wherein sending the encrypted content and the one or more encrypted session keys comprises sending at least some of the encrypted fragments over different channels among the one or more channels.

24. The system of claim 13, wherein the information obtained from the first device and the information obtained from the second device comprises one or more keys that are different from the one or more session keys.

25. One or more non-transitory machine-readable storage devices storing instructions that are executable by a recipient system to perform operations comprising:
   receiving encrypted content and one or more encrypted session keys over one or more channels, the encrypted content comprising content that has been encrypted using one or more session keys, the one or more encrypted session keys comprising the one or more session keys that have been encrypted using one or more other keys that are different from the one or more session keys;
   after receiving encrypted content and one or more encrypted session keys, obtaining the one or more other keys from a first device that is not affiliated with a second device that enables the one or more channels;
   decrypting the one or more encrypted session keys using the one or more other keys to produce the one or more session keys at the recipient system; and
   decrypting the encrypted content using the one or more session keys to produce the content at the recipient system;
   wherein the recipient system is different from both the first device and the second device.

26. The one or more non-transitory machine-readable storage devices of claim 25, wherein the operations comprise:
   receiving data for verifying an integrity of the content over the one or more communication channels; and
   verifying the integrity of the content at the recipient system using the data.

27. The one or more non-transitory machine-readable storage devices of claim 26, wherein the data is a hash of the content.

28. The one or more non-transitory machine-readable storage devices of claim 25, wherein the encrypted content comprises fragments of the content that each have been encrypted using a session key among the one or more session keys to produce encrypted fragments; and
   wherein receiving the encrypted content and one or more encrypted session keys comprises receiving, over a same channel among the one or more channels, an encrypted fragment associated with an encrypted session key that is an encrypted version of a session key used to encrypt the encrypted fragment.

29. The one or more non-transitory machine-readable storage devices of claim 25, wherein the encrypted content comprises fragments of the content that each have been encrypted using a session key among the one or more session keys to produce encrypted fragments; and
   wherein receiving the encrypted content and one or more encrypted session keys comprises receiving, over different channels among the one or more channels, an encrypted fragment and an encrypted session key that is an encrypted version of a session key used to encrypt the encrypted fragment.

30. The one or more non-transitory machine-readable storage devices of claim 25, wherein the encrypted content comprises fragments of the content that each have been encrypted using a session key among the one or more session keys to produce encrypted fragments; and
   wherein receiving the encrypted content and one or more encrypted session keys comprises receiving, over a same channel among the one or more channels, an encrypted fragment bundled with an encrypted session key that is an encrypted version of a session key used to encrypt a different encrypted fragment.

31. The one or more non-transitory machine-readable storage devices of claim 25, wherein the encrypted content comprises fragments of the content that each have been encrypted using a session key among the one or more session keys to produce encrypted fragments; and
   wherein receiving the encrypted content and one or more encrypted session keys comprises receiving at least some of the encrypted fragments over different channels among the one or more channels.

* * * * *